United States Patent
Lombas et al.

(10) Patent No.: US 11,321,413 B1
(45) Date of Patent: May 3, 2022

(54) VALIDATING THE DISPLAY OF A DYNAMIC EMAIL ADVERTISEMENT

(71) Applicant: INTERACTIVE OFFERS, LLC, Boca Raton, FL (US)

(72) Inventors: Joseph Lombas, Boca Raton, FL (US); Wesley Desouza, Deerfield Beach, FL (US); Rafael Pereira, Newark, NJ (US)

(73) Assignee: INTERACTIVE OFFERS LLC, Boca Raton, FL (US)

( * ) Notice: Subject to any disclaimer, the term of this patent is extended or adjusted under 35 U.S.C. 154(b) by 0 days.

(21) Appl. No.: 17/249,649

(22) Filed: Mar. 8, 2021

(51) Int. Cl.
| | | |
|---|---|---|
| G06F 15/16 | (2006.01) | |
| G06F 16/955 | (2019.01) | |
| H04L 51/234 | (2022.01) | |
| H04L 51/046 | (2022.01) | |
| H04L 51/08 | (2022.01) | |
| H04L 51/18 | (2022.01) | |

(52) U.S. Cl.
CPC .......... G06F 16/955 (2019.01); H04L 51/046 (2013.01); H04L 51/08 (2013.01); H04L 51/18 (2013.01); H04L 51/34 (2013.01)

(58) Field of Classification Search
CPC ....... G06F 16/955; H04L 51/18; H04L 51/08; H04L 51/046; H04L 51/34; G06Q 30/02; G06Q 30/0241; G06Q 30/0242; G06Q 30/0277
USPC ........... 709/206, 224; 705/14.4, 14.41, 14.73
See application file for complete search history.

(56) References Cited

U.S. PATENT DOCUMENTS

| | | | | |
|---|---|---|---|---|
| 10,528,976 | B1 * | 1/2020 | Fries ........................ | H04L 67/04 |
| 2005/0076051 | A1 * | 4/2005 | Carobus ............. | G06Q 30/0277 |
| 2012/0303429 | A1 * | 11/2012 | Nolledo ................. | G06Q 30/02 |
| | | | | 705/14.16 |
| 2013/0159093 | A1 * | 6/2013 | Chavan .............. | G06Q 30/0241 |
| | | | | 705/14.45 |
| 2016/0294765 | A1 | 10/2016 | Mayala | |
| 2017/0358000 | A1 | 12/2017 | Jain | |
| 2019/0139170 | A1 | 5/2019 | Subramanian | |
| 2021/0012376 | A1 * | 1/2021 | Donovan ........... | G06Q 30/0275 |

OTHER PUBLICATIONS

Office Action dated Feb. 23, 2021 for related U.S. Appl. No. 16/454,032.

* cited by examiner

Primary Examiner — Johnny B Aguiar
(74) Attorney, Agent, or Firm — Ohanian IP Law Firm; H. Artoush Ohanian (57) ABSTRACT

Validating the display of a dynamic email advertisement includes receiving, by an advertisement server ('ad server') from an email client, a request for an advertisement ('ad') and one or more tracking requests; pausing, by the ad server, all responses to the tracking requests; selecting, by the ad server from a database, an ad bundle; queuing, by the ad server the tracking requests; assigning, by the ad server a redirect from the ad bundle to each tracking request; unpausing, by the ad server, responses to the tracking requests; sending, by the ad server to the email client, a response with the selected ad; and for each tracking request assigned a redirect, sending, by the ad server to the email client, a response including the assigned redirect.

20 Claims, 5 Drawing Sheets

VALIDATING THE DISPLAY OF A DYNAMIC EMAIL ADVERTISEMENT

BACKGROUND

Email marketing is pervasive and comes in all shapes and sizes. One of the many challenges for email marketers is determining whether an advertisement ('ad') was actually sent to and received by its target recipient and determining whether the email was actually opened and the advertisement was displayed.

Ad impressions, an advertisement that was actually displayed, are usually tracked by an advertiser's tracking pixel. The tracking pixel is typically implemented as a 1 pixel by 1 pixel image that loads with an ad and reports back to the advertiser that the ad was actually displayed. There is often a unique identifier that specifies what ad was shown to the end user embedded in the uniform resource locator ('URL'). The tracking pixel is also able to retrieve information about the user such as Internet Protocol address ('IP address'), User Agent (web browser type, version, operating system, etc), and report this information back to the advertiser.

Script is not executable in email. Therefore, programmatic email ad servers relay the information returned from the ad response to the third-party client for whom the ad is being sent. That is, the advertising agency operating the ad servers must inform their clients that they in fact sent the ad and the ad was displayed. As such, it is easy for the ad servers to emulate many ad impressions that did not actually occur and for adverting agencies to charge clients for those false ad impressions. Thus, this is an opportunity for advertising agencies to commit fraud.

It would be advantageous if there were a method for the third-party client to directly validate the ad impression without any intervention by the advertiser.

DETAILED DESCRIPTION OF EXAMPLE EMBODIMENTS

Figure 1:
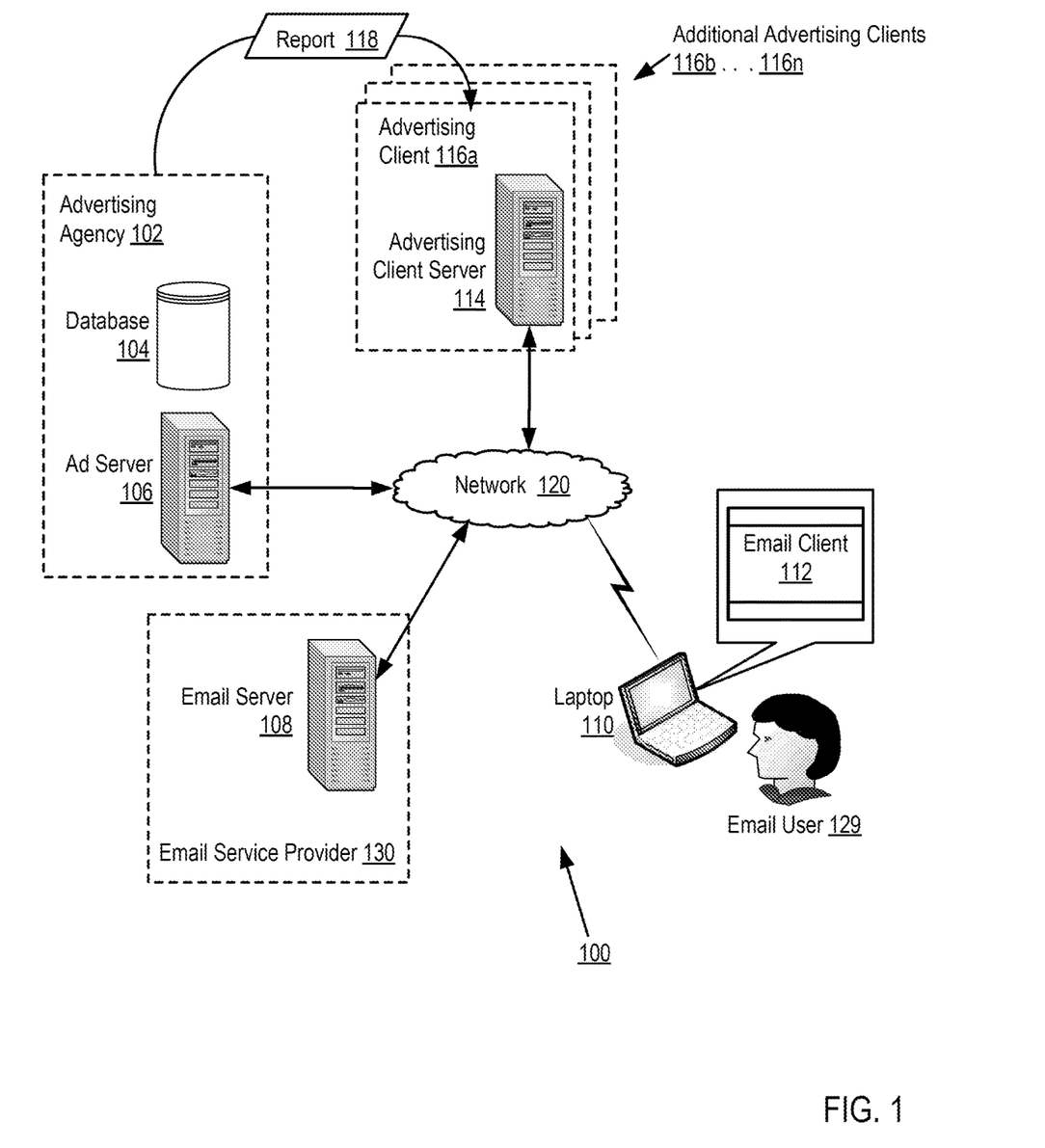
FIG. 1 sets forth a network diagram illustrating an example system for validating the display of a dynamic email advertisement according to embodiments of the present invention.

Example methods, systems, apparatuses, modules, and products for validating the display of a dynamic email advertisement are described with reference to the accompanying drawings, beginning with FIG. 1. FIG. 1 sets forth a network diagram illustrating an example system (100) for validating the display of a dynamic email advertisement according to embodiments of the present invention. The example of FIG. 1 includes an advertising agency (102). An advertising agency according to the example of FIG. 1 is an entity that serves ads for clients.

The advertising agency (102) operates an ad server (106) having access to a database (104) containing ads for selection by the ad server and presentation to a user. An ad server is advertising software hosted on a server to manage online ad campaigns and used by publishers, advertisers, ad agencies, ad networks and the like to serve ads. Ad server software defines what ad to display at what specific time frame and on what website or mobile app to display the ad. There are many kinds of ad servers—open source, self-hosted, video, ad hoc ad server solutions, and others as will occur to those of skill in the art. Ad servers typically also collect data on ad performance such as number of impressions, clicks, click through ratio ('CTR ratio') and others as will occur to those of skill in the art. Such ad performance data is used to define targeting, perform ad budget control, frequency capping and other business and operational processes.

The ad server (106) of FIG. 1 is coupled for data communications to an advertising client server (114) operated by a client (116a) of the advertising agency (102) through a network. As will occur to those of skill in the art, the advertising agency (102) has more than one client and in the example of FIG. 1 each of those additional advertising clients (116b-116n) are coupled for data communications with the ad server (106) through their own servers.

The ad server (106) and advertising client server (114) of FIG. 1 are also coupled for data communications with an email server (108) operated by an email service provider (130). An email service ('ESP') is a company that offers email services. Such services may be implemented through an email marketing platform that creates email templates, maintains subscriber lists, sends emails and provides statistics and results for individual campaigns. Some ESPs also offer consultancy, training, and other email related services.

The ESP (130) of FIG. 1 operates an email server (108). An email server is a computer system that sends and receives email. In order for a computer system to function as a mail server, it must include mail server software. This software allows the system administrator to create and manage email accounts for any domains hosted on the server. Mail servers send and receive email using standard email protocols. For example, the Simple Mail Transfer Protocol ('SMTP') protocol sends messages and handles outgoing mail requests. The Internet Messaging Access Protocol ('IMAP') and Post Office Protocol 3 ('POP3') protocols receive messages and are used to process incoming mail.

The ad server (106), email server (108), and advertising client server (114) are also coupled for data communications with an email client (112) installed on a laptop (110) providing email with dynamic advertisements to an email user (129). An email client is a computer program to access and manage a user's email.

In the example of FIG. 1, the email service provider (130) sends the email client (112) an email containing dynamic advertisements. Dynamic email marketing is the personalization of email messages using dynamic content. Using email with dynamic advertising, an email may be sent to a number of email clients but the ad selected and displayed in that email changes depending on defined parameters as will occur to those of skill in the art.

In the example of FIG. 1, upon the user (129) opening the email, the email client (112) sends the ad server (106) a request for a dynamic ad and one or more pixel requests. The ad server (102) receives the request for an ad and one or more pixel requests. A pixel request is a request sent by the email client to the ad server containing an image. Often the pixel request may contain a blank 1 pixel by 1 pixel image.

A blank image is useful because images are supported by email protocols and therefore provide a useful vehicle in validating the display of dynamic email advertisement according to embodiments of the present invention.

The use of a pixel request in this disclosure is not limiting and is described herein because images are supported by email protocols. In alternative embodiments, the pixel request may be implemented as a tracking request having an identification of the third-party client of the advertising agency on whose behalf the ESP sent the email, a list of replicating individual pixel requests, or in other ways as will occur to those of skill in the art.

Upon receiving the request for the ad and the pixel requests the ad server pauses all responses to the pixel requests and selects an ad bundle from the database. The ad bundle includes an ad and one or more redirects associated with one or more clients of the advertising agency operating the ad server and each redirect identifies a URL to an endpoint for one of the clients of the advertising agency. The ad bundle may be selected based upon a number of criteria such as profitability of serving the ad, demographics of the user, location of the user, time of day, month, or year, or other criterion as will occur to those of skill in the art.

The ad server of FIG. 1 then queues the pixel requests and assigns a redirect from the ad bundle to each pixel request. In some embodiments, the number of pixel requests serviced by the ad server will be limited due to time constraints. That is, to maintain prompt response time a limited number of pixel requests may be serviced for each advertisement. The limit may be set or variable based upon performance requirements, system requirements, and other requirements as will occur to those of skill in the art.

The ad server of FIG. 1 then unpauses the responses to the pixel requests and sends a response with the selected ad to the email client. For each pixel request assigned a redirect, the ad server sends a response to the email client that includes the assigned redirect. The ad server (106) then records that the response with the ad was sent to the email client and records for each redirect assigned to a pixel request that the response with the ad was sent to the email client.

In the example of FIG. 1, the email client (112) receives the response with the selected ad and receives any responses containing redirects assigned to the pixel requests. The email client then displays the selected ad and invokes the redirects. Invoking such a redirect may be carried out by sending a request to the URL identifying the endpoint for one of the clients of the advertising agency. Such an endpoint may be a URL dedicated to receiving such requests by the advertising client server. Upon receiving the request sent by invoking the redirect, the advertising client is made aware that the ad was actually sent by the ad server and displayed by the email client thereby reducing the ability for the advertising agency to defraud the client through false ad impressions.

The advertising agency operating the ad server may create a report of ads sent on behalf of the client and send the report to the client as a vehicle for demonstrating that the ad was actually sent and there is no mistake in any charges associated with the ad. The server operated by the client may receive the requests from email clients to the URL identifying the endpoint for the client, record the receipt of such requests and compare them to the report sent by the advertising agency. In this way, the ad impressions are validated reducing fraud and mistakes in billing.

Figure 2:
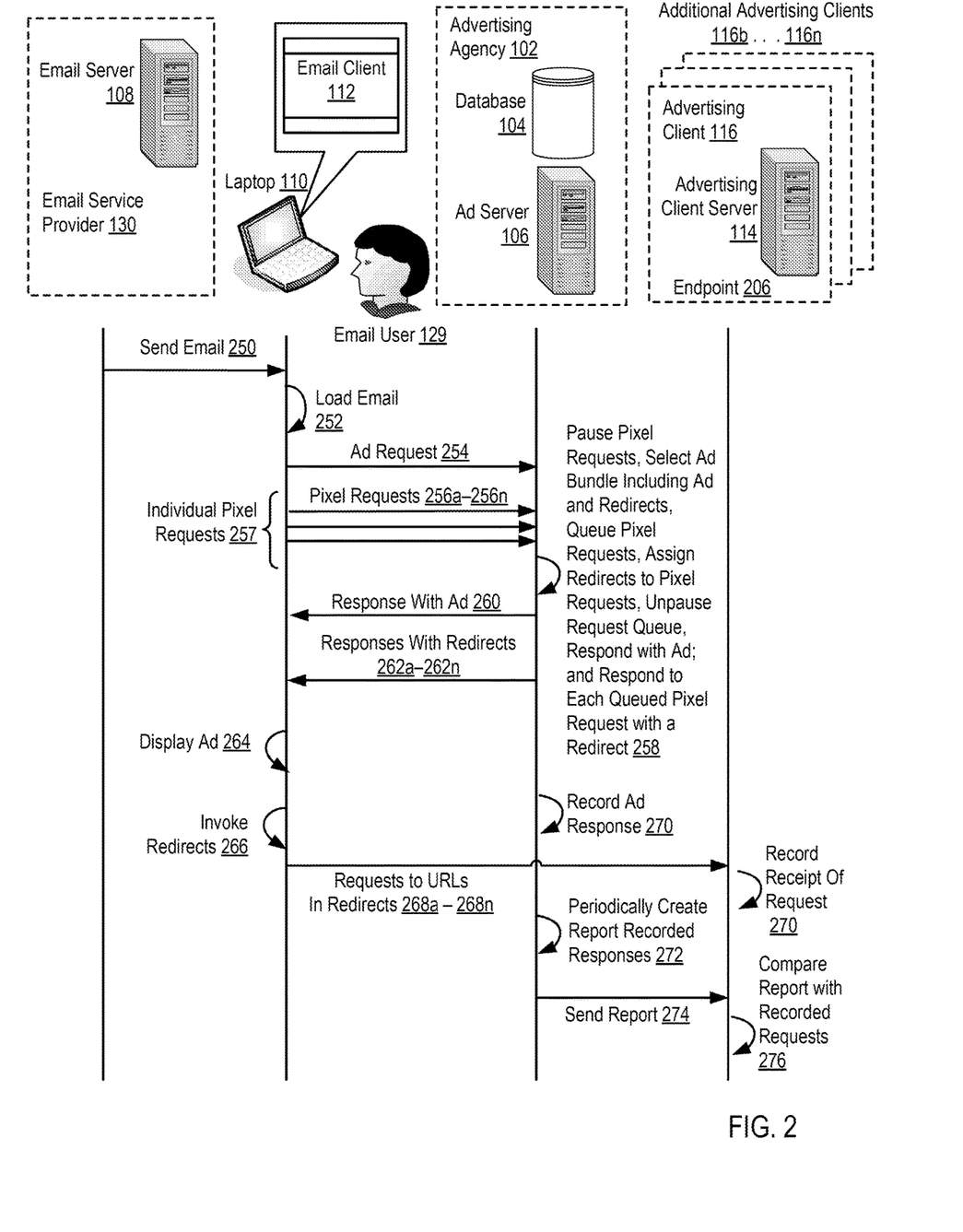
FIG. 2 sets forth a sequence diagram illustrating validating the display of a dynamic email advertisement according to embodiments of the present invention.

For further explanation, FIG. 2 sets forth a sequence diagram illustrating validating the display of a dynamic email advertisement according to embodiments of the present invention. In the example of FIG. 2, an email server (108) of an ESP (130) sends (250) an email to an email client (112) running on a laptop (110) of a email user (129). Upon the user's opening the email, the email client (112) loads (252) the email, identifies a need for an ad in the email, and requests (254) an ad from the ad server (106) operated by the advertising agency (102). The email client (112) also sends a number of pixel requests (256a-256n) to the ad server (106).

In the example of FIG. 2, the ad server (106) receives the ad request (254) and the pixel requests (256a-256n) and services (258) the ad request and pixel request by pausing responses to pixel requests and selecting an ad bundle from the database (104) in dependence upon one or more criteria such as profitability, demographics, location, time and so on.

The ad bundle in the example of FIG. 2 includes an ad and one or more redirects associated with that ad. The ad server (106) queues the pixel requests and assigns a redirect to each queued pixel request it will service. The ad server unpauses the responses to pixel requests and sends a response (260) containing the ad and a response for each pixel request containing its assigned redirect (262a-262n) to the email client (112).

In the example of FIG. 2, the email client (112) receives the response and displays (264) the ad and receives the responses with redirects and invokes (266) the redirects by sending a request to the URL of an endpoint (106) for the server (114) of the advertising client (116).

In the example of FIG. 2, the ad server (102) records (270) that the ad was served, periodically creates a report (272) of the ads served, and sends (274) the report to the advertising client (116). The advertising client also records (270) receipt of requests received as a result of invoking the redirects and compares the record of request with the report. The advertising client is enabled to verify that each ad on the report was associated with a redirect to the advertising clients endpoint reducing any mistakes or fraud.

Figure 3:
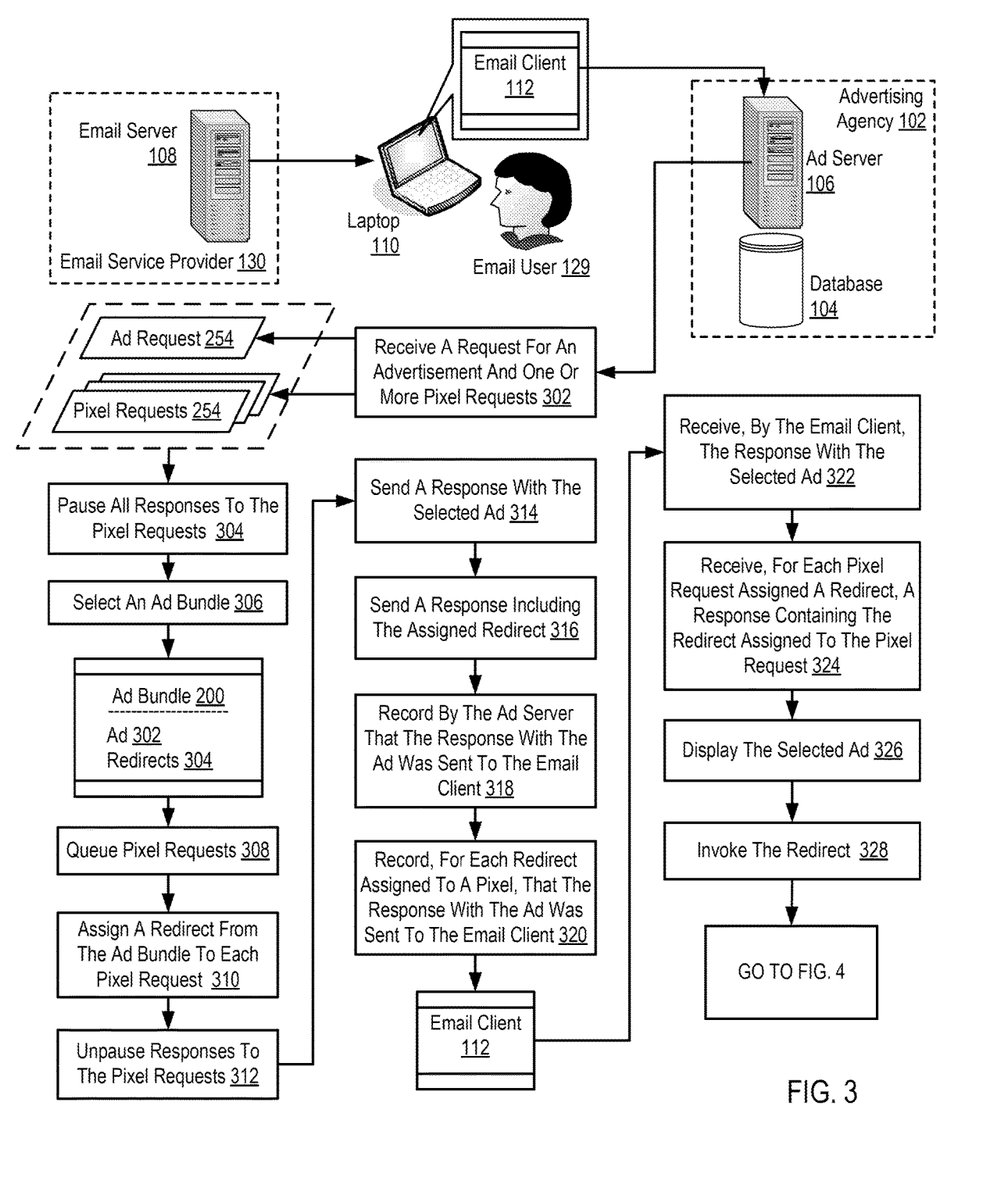
FIGS. 3 and 4 set forth a flow chart illustrating an example method of validating the display of a dynamic email advertisement according to embodiments of the present invention.
Figure 4:
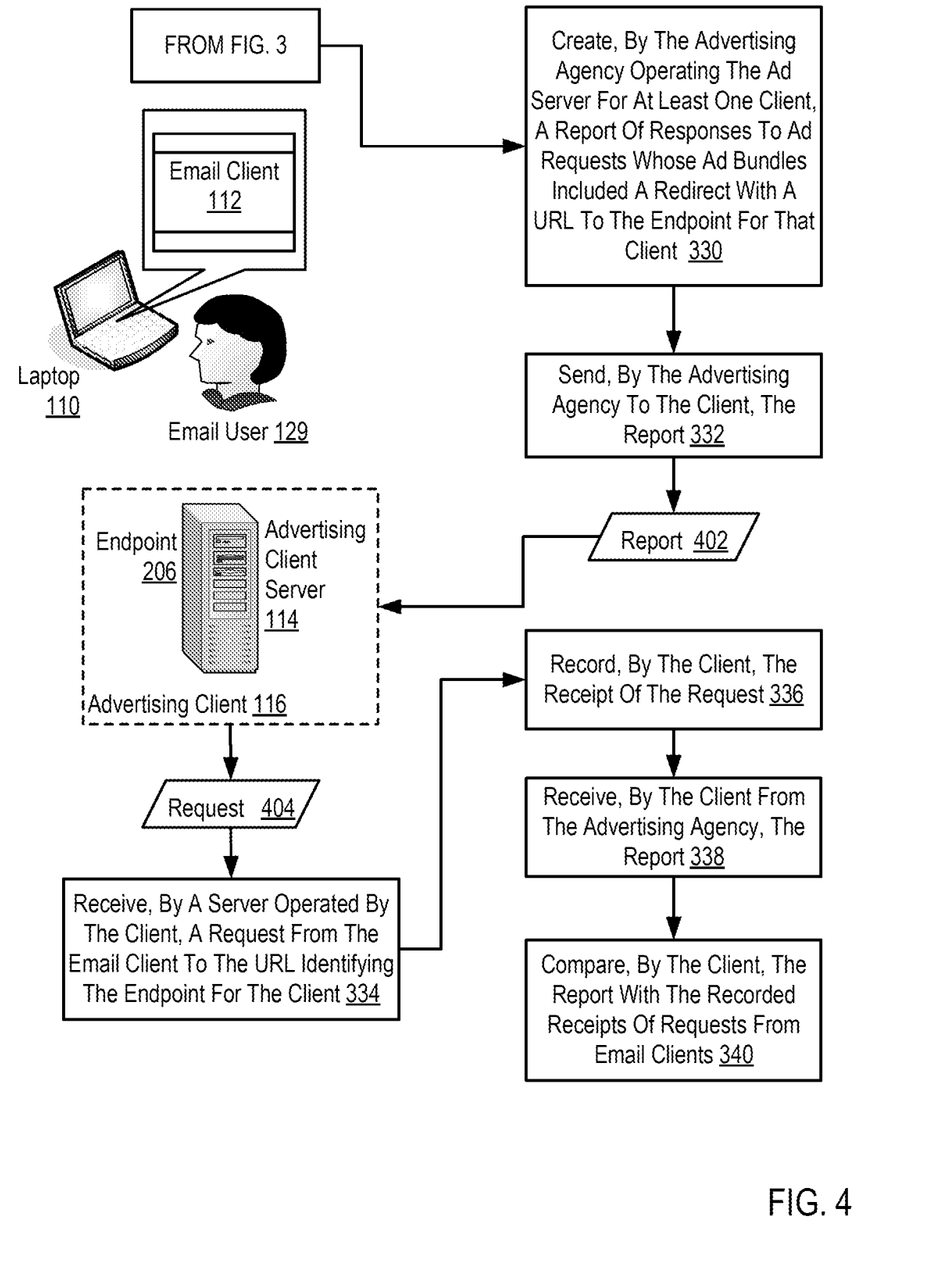

For further explanation, FIGS. 3 and 4 set forth a flow chart illustrating an example method for validating the display of a dynamic email advertisement according to embodiments of the present invention. The method of FIGS. 3 and 4 includes receiving (302), by an ad server (106) from an email client (112), a request (254) for an advertisement ('ad') and one or more pixel requests (256a-256n).

The method of FIGS. 3 and 4 includes pausing (304), by the ad server (106), all responses to the pixel requests (256a-256n). The length of time that pixel requests are paused in the example of FIGS. 3 and 4 varies according to performance requirements, system requirements and so on. The length of time afforded for pausing pixel requests limits the number of pixel requests that can be serviced and this number is also a factor in establishing the length of time that servicing pixel requests are paused.

The method of FIGS. 3 and 4 includes selecting (306), by the ad server (106) from a database (104), an ad bundle (200). The ad bundle (200) in the example of FIGS. 3 and 4 includes an ad (302) and one or more redirects (304) associated with one or more clients (116) of the advertising agency (102) operating the ad server (106), and each redirect (304) identifies a URL to an endpoint (206) for one of the clients (116) of the advertising agency (102). The ad bundle may be selected based upon a number of criteria such as profitability of serving the ad, demographics of the user, location of the user, time of day, month, or year, or other criterion as will occur to those of skill in the art.

The method of FIGS. 3 and 4 includes queuing (308), by the ad server (106), the pixel requests. Pixel requests may be queued in order of receipt such as First In, First Out ('FIFO'), Last In, Last Out ('LIFO') or other order, random order or in any other manner that will occur to those of skill in the art. Regardless of queuing method, the number of pixel requests services will be limited by the time determined for pausing the service of such requests.

The method of FIGS. 3 and 4 includes assigning (310), by the ad server (106), a redirect from the ad bundle to each pixel request (256a-256n). A redirect is typically implemented using a URL to an endpoint of a client of the advertising agency.

The method of FIGS. 3 and 4 includes unpausing (312), by the ad server (106), responses to the pixel requests (256a-256n), Once unpaused, service of the pixel requests begins. The method of FIGS. 3 and 4 continues by sending (314), by the ad server (106) to the email client (112), a response (260) with the selected ad and for each pixel request (256a-256n) assigned a redirect, sending (316), by the ad server (106) to the email client (112), a response (262a-262n) including the assigned redirect.

The method of FIGS. 3 and 4 includes recording (318), by the ad server (106), that the response with the ad was sent to the email client (112). The method of FIGS. 3 and 4 also includes recording (320), by the ad server (106), for each redirect (304) assigned to a pixel, that the response with the ad (302) was sent to the email client (112).

The method of FIGS. 3 and 4 includes receiving (322), by the email client (112), the response (260) with the selected ad (302) and receiving (324), by the email client (112) for each pixel request (256a-256n) assigned a redirect, a response (262a-262n) containing the redirect assigned to the pixel request.

The method of FIGS. 3 and 4 includes displaying (326), by the email client (112), the selected ad and invoking (328), by the email client (112), the redirect. Invoking the redirect may be carried out by sending a request (258a-258n) to the URL identifying the endpoint (206) for one of the clients (116) of the advertising agency (102).

The method of FIGS. 3 and 4 includes creating (330), by the advertising agency (102) operating the ad server (106) for at least one client (114), a report of responses to ad requests and sending (332), by the advertising agency (102) to the client (116), the report.

The method of FIGS. 3 and 4 includes receiving (334), by a server (114) operated by the client (116), a request from the email client (112) to the URL identifying the endpoint (206) for the client (116) and recording (336), by the client (116), the receipt of the request. (268a).

The method of FIGS. 3 and 4 includes receiving (338), by the client (116) from the advertising agency (102), the report and comparing (340), by the client (116), the report with the recorded receipts of requests from email clients.

Figure 5:
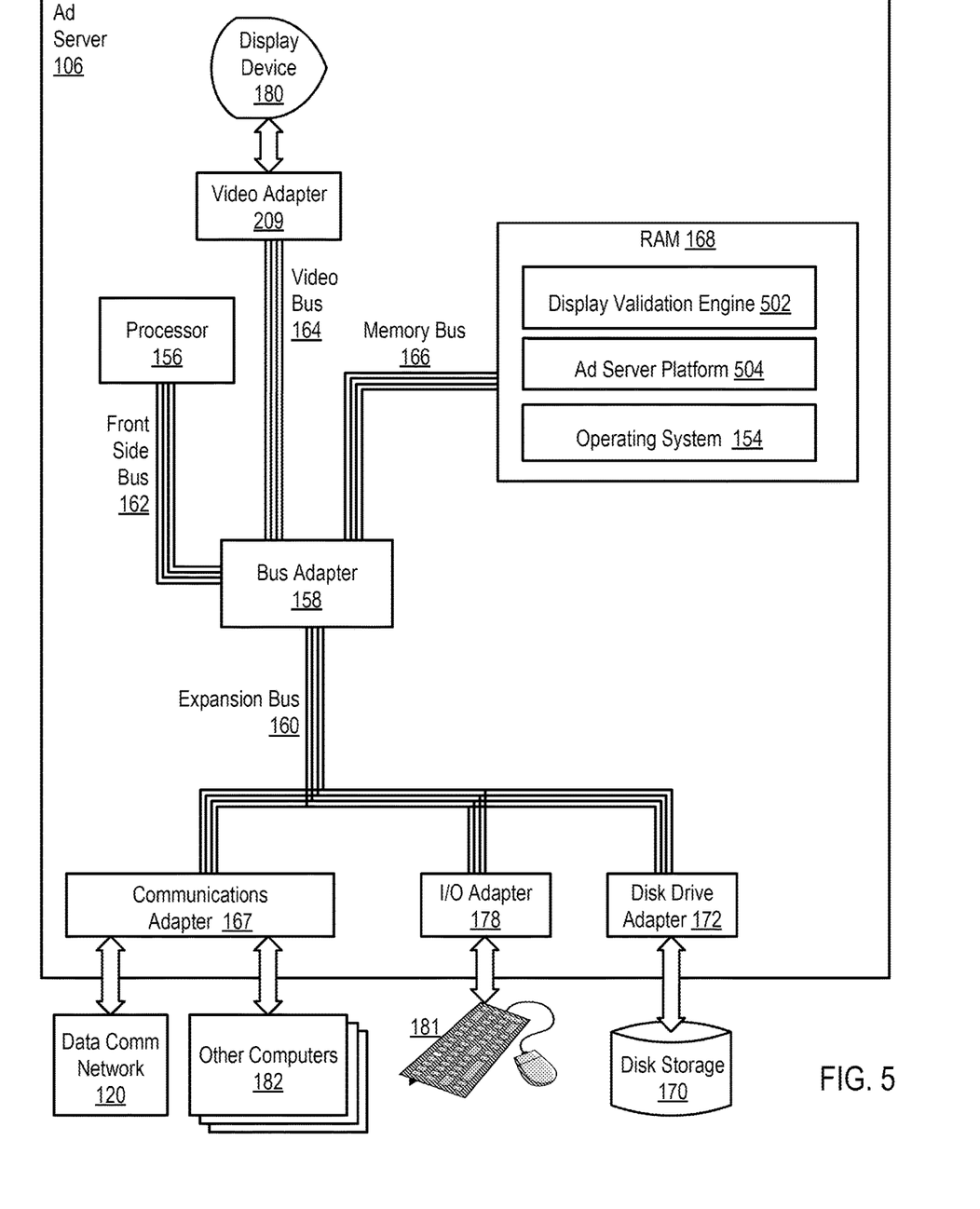
FIG. 5 sets forth a block diagram of automated computing machinery comprising an example of a computer useful as an ad server (106) for validating the display of a dynamic email advertisement according to embodiments of the present invention.

For further explanation, FIG. 5 sets forth a block diagram of automated computing machinery comprising an example of a computer useful as an ad server (106) for validating the display of a dynamic email advertisement according to embodiments of the present invention. The ad server (106) of FIG. 5 includes at least one computer processor (156) or central processing unit ('CPU') as well as random access memory (168) ('RAM') which is connected through a high-speed memory bus (166) and bus adapter (158) to processor (156) and to other components of the ad server. The processor is connected through a video bus (164) to a video adapter (209) and a computer display (180). The processor is connected through an expansion bus (160) to a communications adapter (167), an Input/Output ('I/O') adapter (178), and a disk drive adapter (172). The processor is connected to a speech-enabled laptop (126) through data communications network (100) and wireless connection (118). Disposed in RAM is an operating system (154).

Also disposed in RAM are an ad server platform (504) and a display validation engine (502). An ad server platform (504) is a suite of modules, application programming interfaces ('APIs'), for serving ads to clients. The example ad server platform also collects data on ad performance such as number of impressions, clicks, CTR ratio and others as will occur to those of skill in the art. Such ad performance data may be used to define targeting, perform ad budget control, frequency capping and other business and operational processes.

The display validation engine (502) of FIG. 5 is implemented as a module of automated computing machinery stored in non-transitory computer-readable medium configured to receive, from an email client, a request for an advertisement ('ad') and one or more pixel requests; pause all responses to the pixel requests; select from a database an ad bundle. The display validation engine (502) of FIG. 5 is configured to queue the pixel requests; assign a redirect from the ad bundle to each pixel request; unpause responses to the pixel requests; send, to the email client, a response with the selected ad; and for each pixel request assigned a redirect, send, to the email client, a response including the assigned redirect. The display validation engine (502) of FIG. 5 is further configured to record that the response with the ad was sent to the email client and to record for each redirect assigned to a pixel that the response with the ad was sent to the email client.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for validating a display of a dynamic email advertisement, the method comprising:

receiving, by an advertisement server ('ad server') from an email client, a request for an advertisement ('ad') and one or more tracking requests;

pausing, by the ad server, all responses to the one or more tracking requests;

selecting, by the ad server from a database, an ad bundle, wherein the ad bundle comprises an ad and one or more redirects associated with one or more clients of an advertising agency operating the ad server, and wherein each redirect of the one or more redirects identifies a Uniform Resource Locator ('URL') to an endpoint for one of the one or more clients of the advertising agency;

queuing, by the ad server, the one or more tracking requests;

assigning, by the ad server, a redirect from the ad bundle to each of the one or more tracking requests;

unpausing, by the ad server, responses to the one or more tracking requests;

sending, by the ad server to the email client, a response with the ad of the selected ad bundle; and for each tracking request of the one or more tracking requests assigned a redirect, sending, by the ad server to the email client, a response including the assigned redirect.

2. The method of claim 1, wherein each of the one or more tracking requests comprises a pixel request containing at least one pixel.

3. The method of claim 1, further comprising recording, by the ad server, that the response with the ad of the selected ab bundle was sent to the email client.

4. The method of claim 1, further comprising recording, by the ad server, for each redirect assigned to a tracking request, that the response with the ad of the selected ab bundle was sent to the email client.

5. The method of claim 1, further comprising:
receiving, by the email client, the response with the ad of the selected ad bundle;
receiving, by the email client for each tracking request assigned a redirect, a response containing a particular redirect assigned to a particular tracking request;
displaying, by the email client, the ad of the selected ad bundle; and
invoking, by the email client, the particular redirect.

6. The method of claim 5, wherein invoking the particular redirect further comprises sending a request to the URL identifying the endpoint for one of the one or more clients of the advertising agency.

7. The method of claim 1, further comprising:
creating, by the advertising agency operating the ad server for at least one client, a report of responses to ad requests; and
sending, by the advertising agency to the at least one client, the report.

8. The method of claim 7, further comprising:
receiving, by a server operated by the at least one client, a request from the email client to the URL identifying an endpoint for the at least one client;
recording, by the at least one client, a receipt of the request.

9. The method of claim 8, further comprising:
receiving, by the at least one client from the advertising agency, the report; and
comparing, by the at least one client, the report with recorded receipts of requests from email clients.

10. A display validation engine, the display validation engine comprising a module of automated computing machinery stored in non-transitory computer-readable medium configured to:
receive, from an email client, a request for an advertisement ('ad') and one or more pixel requests;
pause all responses to the one or more pixel requests;
select from a database an ad bundle,
wherein the ad bundle comprises an ad and one or more redirects associated with one or more clients of an advertising agency operating an ad server, and
wherein each redirect of the one or more redirects identifies a Uniform Resource Locator ('URL') to an endpoint for one of the one or more clients of the advertising agency;
queue the one or more pixel requests;
assign a redirect from the ad bundle to each pixel request of the one or more pixels requests;
unpause responses to the one or more pixel requests;
send, to the email client, a response with the ad of the selected ad bundle; and
for each pixel request assigned a redirect, send, to the email client, a response including the assigned redirect.

11. The display validation engine of claim 10, further configured to record that the response with the ad of the selected ad bundle was sent to the email client.

12. The display validation engine of claim 10, further configured to record for each redirect assigned to a pixel request that the response with the ad of the selected ad bundle was sent to the email client.

13. A method for validating a display of a dynamic email advertisement, the method comprising:
receiving, by an advertisement server ('ad server') from an email client, a request for an advertisement ('ad') and one or more pixel requests;
pausing, by the ad server, all responses to the one or more pixel requests;
selecting, by the ad server from a database, an ad bundle, wherein the ad bundle comprises an ad and one or more redirects associated with one or more clients of an advertising agency operating the ad server, and
wherein each redirect of the one or more redirects identifies a Uniform Resource Locator ('URL') to an endpoint for one of the one or more clients of the advertising agency;
queuing, by the ad server, the one or more pixel requests;
assigning, by the ad server, a redirect from the ad bundle to each pixel request of the one or more pixel requests;
unpausing, by the ad server, responses to the one or more pixel requests;
sending, by the ad server to the email client, a response with the ad of the selected ad bundle; and
for each pixel request assigned a redirect, sending, by the ad server to the email client, a response including the assigned redirect.

14. The method of claim 13, further comprising recording, by the ad server, that the response with the ad of the selected ad bundle was sent to the email client.

15. The method of claim 13, further comprising recording, by the ad server, for each redirect assigned to a pixel request, that the response with the ad of the selected ad bundle was sent to the email client.

16. The method of claim 13, further comprising:
receiving, by the email client, the response with the ad of the selected ad bundle;
receiving, by the email client for each pixel request assigned a redirect, a response containing a particular redirect assigned to a particular pixel request;
displaying, by the email client, the ad of the selected ad bundle; and
invoking, by the email client, the particular redirect.

17. The method of claim 16, wherein invoking the particular redirect further comprises sending a request to the URL identifying the endpoint for one of the one or more clients of the advertising agency.

18. The method of claim 13, further comprising
creating, by the advertising agency operating the ad server for at least one client, a report of responses to ad requests; and
sending, by the advertising agency to the at least one client, the report.

19. The method of claim 18, further comprising:
receiving, by a server operated by the at least one client, a request from the email client to the URL identifying an endpoint for the at least one client;
recording, by the at least one client, the receipt of the request.

20. The method of claim 19, further comprising:
receiving, by the at least one client from the advertising agency, the report; and comparing, by the at least one client, the report with recorded receipts of requests from email clients.

\* \* \* \* \*